Oct. 3, 1933.    B. HALL    1,928,755
REFRIGERATING MACHINE
Filed Aug. 18, 1930    4 Sheets-Sheet 1

INVENTOR
Bicknell Hall
BY
ATTORNEY

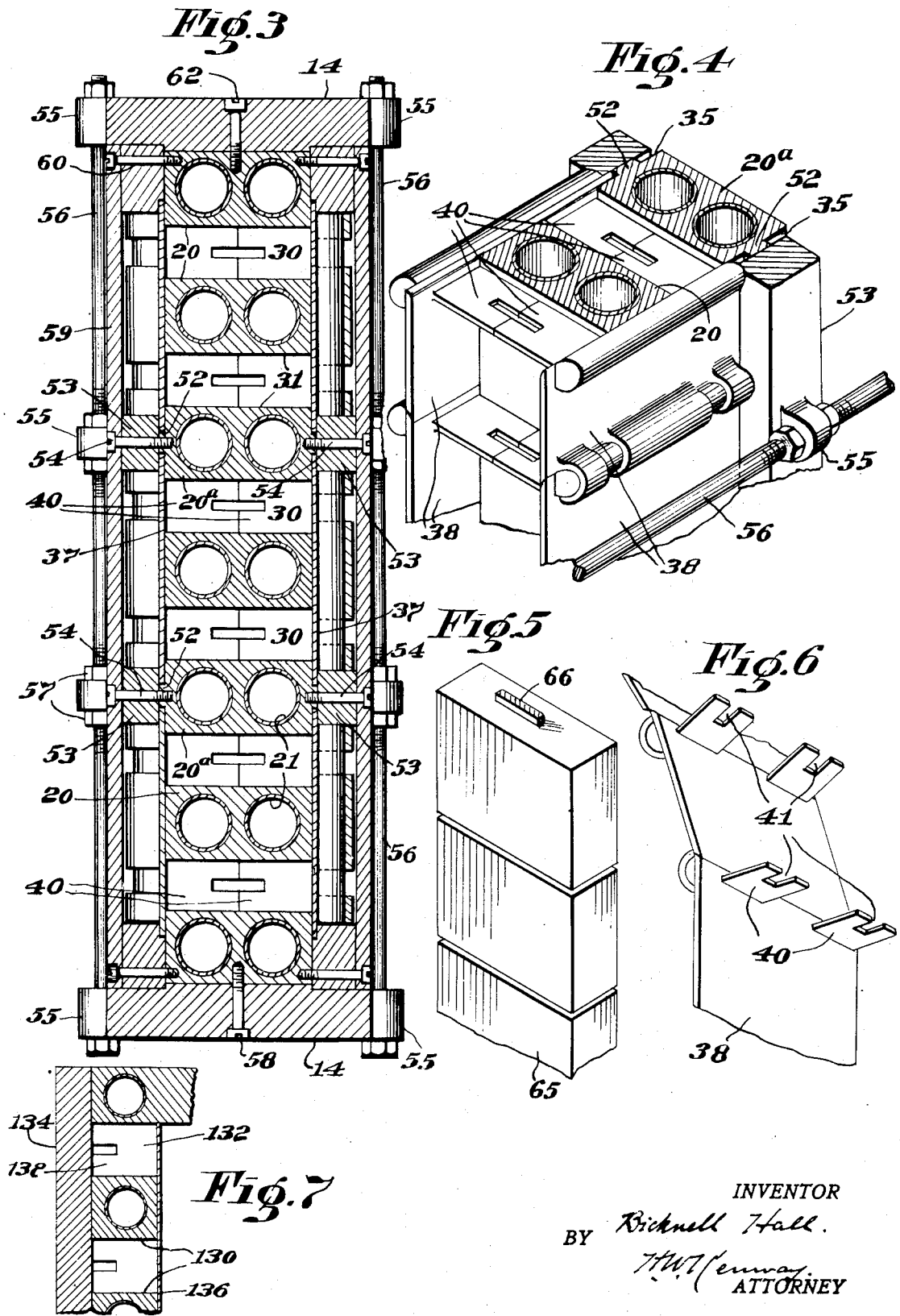

Oct. 3, 1933.   B. HALL   1,928,755
REFRIGERATING MACHINE
Filed Aug. 18, 1930   4 Sheets-Sheet 3
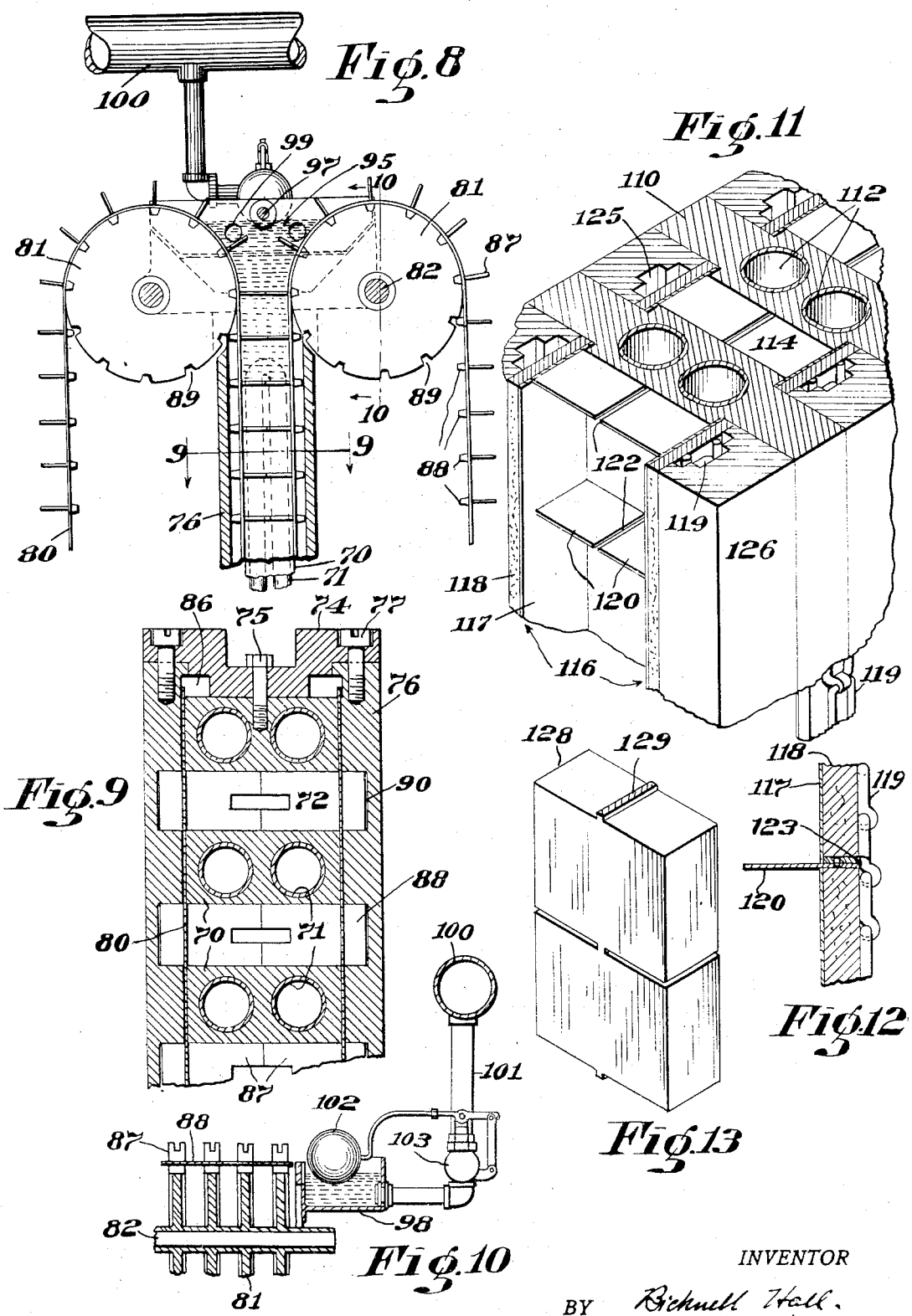

Oct. 3, 1933.  B. HALL  1,928,755
REFRIGERATING MACHINE
Filed Aug. 18, 1930  4 Sheets-Sheet 4
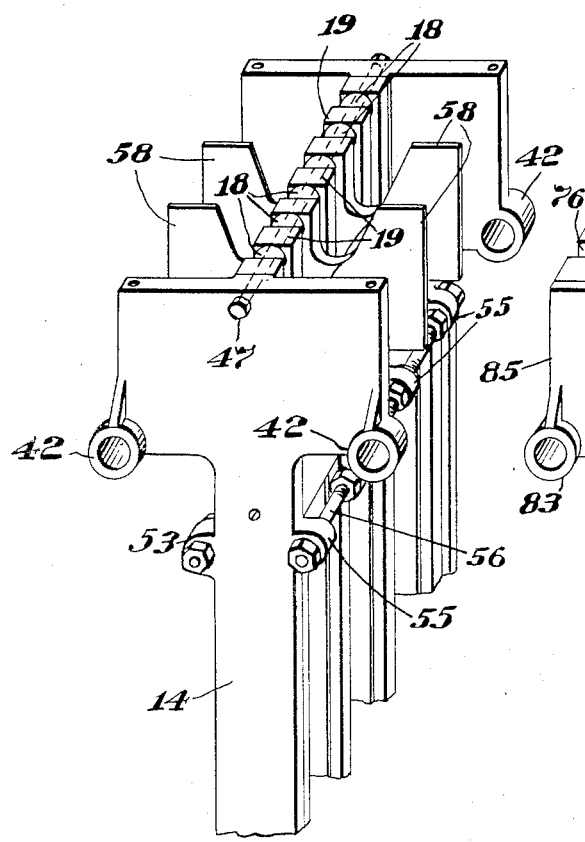
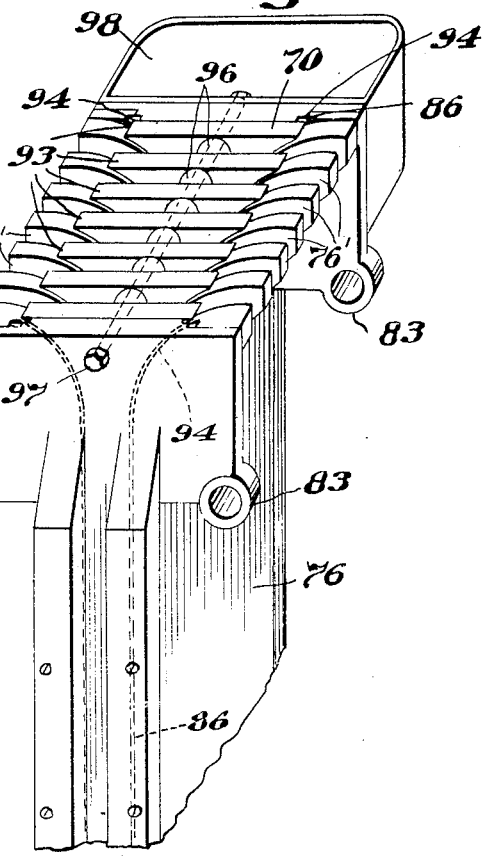
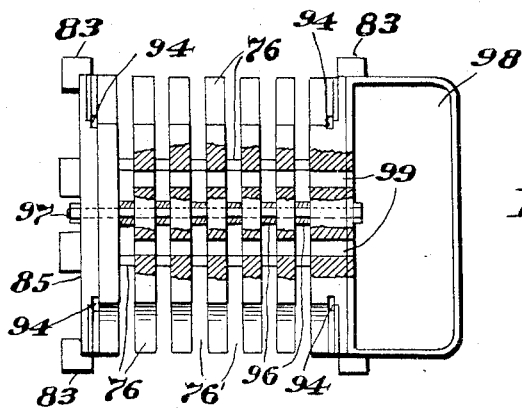
INVENTOR
Bicknell Hall
BY
ATTORNEY Patented Oct. 3, 1933

1,928,755

UNITED STATES PATENT OFFICE 1,928,755

REFRIGERATING MACHINE

Bicknell Hall, Gloucester, Mass., assignor to Frosted Foods Company, Inc., Dover, Del., a corporation of Delaware Application August 18, 1930. Serial No. 476,061

23 Claims. (Cl. 62—114)

This invention relates to refrigerating machines for forming congealed blocks or cakes from any moisture-containing material, and contemplates more especially the provision of a machine adapted to operate continuously and automatically in producing congealed blocks of comestibles directly from unfrozen or partially frozen material. The invention contemplates the congelation of any desired material including liquids, treated semi-liquids or slush, and solids. The liquids may consist of such materials as fruit juices; the semi-liquids or slush may be a partially-frozen liquid or any non-solid material which does not flow as freely as liquids; and the solids may be such normally soft materials or comestibles as spinach, fruit, berries, and the like which are adaptable to being packed and frozen into block form.

Ice cream, ices and like frozen edibles are commonly chilled or partially congealed in bulk and then packed in consumer packages and placed in refrigeration for transportation and sale. This method of procedure requires a rehandling of the material and entails a considerable amount of work and expense. The machine of my invention may be employed advantageously in this field to form congealed consumer blocks directly from the unfrozen material in a single operation.

In another aspect, my invention comprises a novel refrigerating machine useful for carrying out the method disclosed in my copending application Serial No. 476,062 filed herewith, in which the material to be congealed is passed over and in contact with a refrigerating surface. The machine herein disclosed is provided with a chamber or chambers of the shape desired of the congealed block and one or more walls of each chamber may comprise a refrigerating surface of a nature to act on and congeal the material as it passes along and over the surface.

My invention, as herein disclosed, particularly contemplates a machine which will receive the material at one end of one or more elongated refrigerating passages, carry such material through the passages in separate chambers or compartments, preferably continuously and at a speed permitting the congealing of the material during such passage, and finally eject the congealed blocks at the other end of the passages. A more specific object of my invention is to provide such a machine for the congealing of orange juice and like liquid or semi-liquid materials into blocks which can be conveniently handled, transported and stored in commerce. The blocks may be used or consumed in any desired manner but in the case of orange or like juices it is proposed to distribute the juice to the consumer in block form to be melted in providing fresh fruit drinks. The juice may be frozen immediately upon being extracted from the fruit and kept in such frozen state that the blocks, upon being melted, will reassume its natural fresh form with its original flavor and freshness.

In the accompanying drawings I have illustrated certain specific embodiments of my invention but it will be understood that the invention can be otherwise embodied and that the drawings are not to be construed as defining or limiting the scope of the invention, the claims appended hereto being relied upon for that purpose.

Referring to the figures of the drawings:

Fig. 3 is an enlarged plan section taken on line 3—3 of Fig. 1;

Fig. 4 is a fragmentary perspective view of Fig. 3;

Fig. 5 is a perspective view of a line of congealed blocks formed by the machine;

Fig. 6 is a fragmentary perspective view of one of the conveyor belts;

Fig. 7 is a fragmentary view similar to Fig. 3 but showing a modified form of the machine;

Fig. 8 is a fragmentary front elevation, partially in section, showing another modified form of the invention;

Fig. 9 is a fragmentary plan section taken on line 9—9 of Fig. 8;

Fig. 10 is a sectional view taken on line 10—10 of Fig. 8;

Fig. 11 is a view similar to Fig. 4 but showing a modification thereof;

Fig. 12 is a fragmentary sectional view through a conveyor belt of Fig. 11;

Fig. 13 illustrates two congealed blocks formed by the machine shown in Fig. 11;

Fig. 14 is a perspective view of a portion of the machine shown in Figs. 1 to 6;

Fig. 15 is a similar view of a portion of the machine shown in Figs. 8, 9 and 10; and Fig. 16 is a plan view of Fig. 15.

Figure 1:
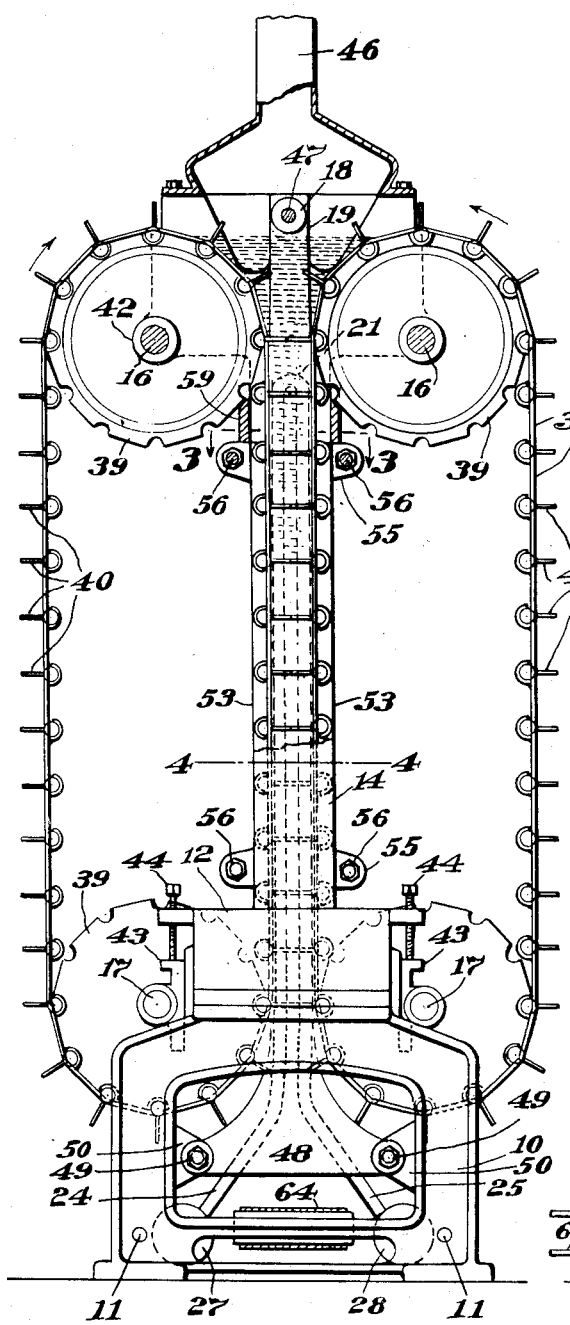
Fig. 1 is a view in front elevation, partially in section, of a machine constructed in accordance with my invention.
Figure 2:
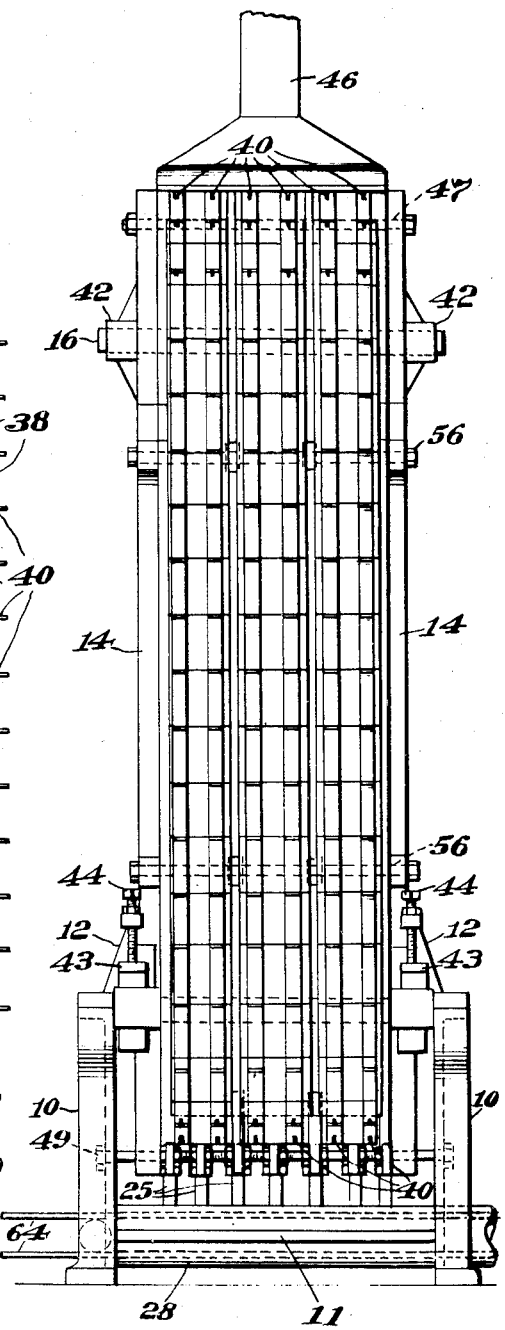
Fig. 2 is a view in side elevation thereof.

The form of my invention which I will first describe is shown in Figs. 1 to 6 of the drawings and is particularly adapted to the congealing of slush material. As illustrated, a frame comprising a pair of uprights 10 connected by rods 11 extends inwardly and upwardly to provide two vertical supporting plates 12. Integral with or otherwise connected to the plates 12 is a pair of relatively long vertically-extending end plates 14. These end plates are the main support for the chamber-forming refrigerating members now to be described.

I provide a plurality of refrigerating members 20 and 20a intermediate the end plates 14, each of these members comprising a U-shaped pipe or tube 21 having vertically-extending elongated parallel portions and diverging ends 24 and 25 respectively connected to supply and discharge headers 27 and 28. Each tube 21 is formed into a rectangular refrigerating member 20 by the application of a suitable heat-conductive material thereto, as best seen in Fig. 3, and the members are relatively spaced to provide elongated passages 30 between opposite walls 31 thereof. The other two sides of each passage are closed by the conveyor belts hereinafter described.

While I have herein illustrated the apparatus as embodying seven refrigerating members 20 and 20a forming six refrigerating passages 30 therebetween, it will be understood that this number may be increased or diminished, as desired. The outer walls 35 of the members 20 and 20a are flat and preferably right angular to the walls 31, whereby to receive thereagainst closure members in the form of conveyor belts 37. The invention as illustrated embodies a pair of these belts for each two adjacent passages 30, the belts engaging tightly against the walls 35 in a manner sealing the adjacent sides of the passages against the escape of liquid therefrom. The belts comprise pivotally connected links or flat plates 38 and each belt is carried on two pairs of sprockets 39 on shafts 16 and 17. Each link 38 furthermore carries a pair of separator plates 40 at right angles thereto and adapted to extend into the passages 30, the separators being so arranged on the oppositely-disposed belts that they cooperate in end to end relation to form partitions movable with the belts through the passages, and the separators are so relatively spaced that they divide the passages into a plurality of equal compartments. The inner ends of the separators may be notched at 41 to permit the escape of air and thus avoid air bubbles in the frozen product and permit expansion of the liquid in freezing. The belts may be driven in the direction indicated by the arrows from any convenient source of power.

The end plates 14 extend outwardly at their upper ends to provide bearings 42 for the shafts 16. The shafts 17 are mounted in bearing slides 43 adjustable by means of screws 44, thereby providing means for adjusting the tension on the belts. A supply header 46 is mounted on the upper ends of the plates 14. The members 20 and 20a also have portions 19 thereof extending upwardly to a position considerably above the U ends of the tubes 21 and the extreme upper ends of these extensions are connected together in proper spaced relation by spacers 18 and a long bolt 47. This bolt extends through the plates 19, spacers 18 and end plates 14 and serves to properly support the upper ends of all the refrigerating members 20. The bottom ends of these members are supported in a similar manner. The bottom end 48 of each member 20 extends outwardly T-shaped, as shown in Fig. 1, and the outer ends thereof are bolted at 49 to ears 50 on the frame 10. The bottom ends of the refrigerating members are thus rigidly supported and held in proper spaced relation.

The two refrigerating members 20a intermediate the three pairs of belts have outwardly projecting portions 52 filling the gaps between the belts. Vertically-extending strips 53 are mounted on these portions and held to the members by bolts 54, thereby forming guideways for the side edges of the belts. For the sake of rigidity, I also form ears 55 on the strips 53 adjacent the top and bottom ends of the channels 30 and extend long bolts 56 through these ears and through the end plates 14. These intermediate members 20a are thereby rigidly supported and they are held in proper spaced relation by means of check nuts 57 on the bolts 56. These two intermediate members also have at their upper ends outwardly-extending portions 58 which fill the gaps between the plates in the trough formed between the end members 14 beneath the header 46. For the purpose of preventing leakage at the upper ends of the passages 30, I may also apply a pair of clamping plates 59 directly against the strips 53, these plates being secured by bolts 54 and 60. No such clamping plates are necessary at the lower end of the device since the material at that point is quite substantially congealed. The two end members 20 are bolted to the end plates 14 at 62 and an endless conveyor 64 may be provided beneath the bottom ends of the passages 30 for receiving and conveying the frozen blocks therefrom.

It is believed that the construction, operation and use of my invention will be clear from the above description. Before starting the machine, the members 20 are brought to the desired refrigerating degree and kept at such temperature by circulating cold brine or other refrigerating medium therethrough and a limited amount of slush material to be frozen is then permitted to flow into the top end of the passages and trickle downwardly through the openings formed by the notches 41. This slush quickly congeals sufficiently to fill these openings and prevent further escape of liquid therethrough. The feed of the slush from the header 46 into the trough formed between the end plates 14 is now brought up to the operating point, wherein the slush flows into the top ends of the passages. The operation of the belts 37 is then started and the belts are moved slowly and continuously in the direction indicated by the arrows. The speed of operation of these belts will, of course, depend upon the length of the passages 30 and the degree of refrigeration of the members 20.

As the slush trapped between the separators 40 is moved downwardly through the passages, it is congealed into blocks 65 which drop from the lower end of the passages onto the conveyor belt 64. These blocks, as seen in Fig. 5, are connected together by a fin 66 formed within the notches 41 and which fin may be sufficiently narrow and fragile to be broken by the weight of a block. The belts 64 convey the blocks to a packaging position where they are wrapped or otherwise prepared for the market and the blocks are thereafter kept in refrigeration and sold very much after the manner of the well-known Eskimo pie.

The form of my invention shown in Figs. 8, 9 and 10 is, in general, similar to that above described but its specific construction is somewhat different in order to better adapt the machine to the handling of liquids. This machine comprises a plurality of refrigerating members 70 having brine pipes 71 extending therethrough and forming refrigerating passages or channels 72 therebetween. End plates 74 are secured to the end members 70 by bolts 75 and side plates 76 are secured thereto by bolts 77.

Two wide and continuous belts 80 are used with this form of machine, these belts extending over upper and lower sprockets 81 on shafts 82 rotatable in bearings 83. The bearings 83 are formed on the lower corners of upwardly-extending portions 85 of the side plates 76 (Fig. 15). The belts are preferably of metal, relatively thin and flexible, and each extends from a drain opening 86 in one end plate 74 to a like drain opening in the other end plate. Separators 87, like the separators 40 in Fig. 6, are mounted in spaced relation on each belt by being extended through the belt and having heads 88 formed thereon at the opposite side of the belt. These heads serve as teeth engaging in notches 89 in the sprockets. The side plates 76 are recessed at 90 to accommodate the heads or teeth 88.

The members 70 may be extended upwardly at 93 (Figs. 8 and 15) to a considerable distance above the U ends of the tubes 71 and to a point substantially flush with the top edges of the side members 85. These extensions 93 are somewhat T-shaped and their side edges are preferably arcuate to engage the curved upper portion of the belts. The drains 86 are curved in like manner at 94, as are also the cooperating top portions of the side plates 76. The curved upper ends of plates 76 are slotted at 76¹ to provide clearance for receiving the sprockets 81. The arrangement is such that the two belts form the sides of a trough 95 at the top ends of the channels 72 and the end members 70 and 85 form the ends of the trough. The members 93 and 85 are anchored and secured together in proper spaced relation by a long bolt 97, spacers 96 being provided thereon between the several members 93.

A supply tank 98 is mounted on the outer ends of one of the members 85 and holes 99 through the wall and through the adjacent member 85 and members 93 serve to pass the liquid into the several channels 72. The liquid may be supplied from a header 100 through a pipe 101 extending into the tank. A float 102 and valve 103 act to automatically keep the liquid in the tank to the proper operating level.

The operation of this form of the invention is, in general, the same as has been above described in reference to Figs. 1 to 6. This machine is, however, substantially liquid-tight. Any liquid seeping from one channel 72 to another channel 72 (Fig. 9) is of no concern and any liquid seeping past the end members 70 will pass off through the drains 86. The slots in the ends of the separators 81 serve to permit the escape of air and to allow for expansion of the product in freezing.

In Figs. 11, 12 and 13 I have shown another modified form of my machine particularly adapted to the handling of liquids. The refrigerating members 110 have refrigerant-carrying pipes 112 therethrough and are relatively spaced to form refrigerating passages or channels 114 therebetween. A pair of endless belts 116 are provided for closing the sides of each channel and each of these belts comprises a thin metal belt 117 movable with and upon a rubber-impregnated canvas belt 118, both being anchored to a sprocket-engaging chain 119. Pairs of cooperating separators 120 are carried by the belts and the ends thereof are in relatively spaced relation at 122 to permit the escape of air and to provide for freezing expansion. Each separator plate extends through the belt 117 and into the canvas belt 118 and is riveted or otherwise secured to a member 123 formed as an integral part of a link of the chain 119 and extending into a transverse slot in the belt 118. These members serve the double function of anchoring the belts 117 and 118 to the chain and to each other and of providing separators within the channels 114. The chains are guided to run within channels 125 in the filler pieces 126. It will be understood that the belts 116 are endless and extend over sprockets at opposite ends of the channels 114. The chains 119 provide strong carriers for the belts and the belt 118 serves as a gasket preventing leakage of liquid from the channels. The machine is adapted to form congealed blocks 128 connected by relatively narrow portions 129.

While I have above described a form of my invention which embodies a pair of conveyor and separator-carrying belts, it will be understood that the invention is by no means to be considered as thus limited since modifications thereof, such as the use of a single belt, will readily be apparent. I have by way of illustration, in Fig. 7, shown my invention as carried out by the use of a single belt. This construction comprises a plurality of refrigerating members 130 relatively spaced to provide refrigerating channels 132 therebetween. One of the open sides of the channels is closed by a plate 134 and the other side is closed by a belt 136 carrying a plurality of separators 138 dividing the channels into a plurality of chambers in the manner illustrated in Fig. 8. It will, of course, be obvious that this belt 136 may be of any desired construction, including the several specific forms herein disclosed. The operation of this form of the invention will be obvious since it is substantially the same as has been above described.

Also, while I have herein illustrated machines particularly adapted to the handling of slush material and liquids, it will be understood that freezable solids may be handled in like manner merely by providing a suitable hopper means for feeding such material into the freezing channels or chambers.

Having thus described my invention, what I claim as new and desire to secure by Letters Patent is:

1. A refrigerating machine for forming congealed blocks of moisture-containing material or comestibles, comprising refrigerating means forming an elongated passage having parallel side walls, a plurality of elements extending into the passage and relatively spaced to form compartments, means for supplying the uncongealed material to the compartments at one end of the passage, and means for moving the elements through the passage where the material within the compartments is congealed into block form.

2. A refrigerating machine for forming congealed blocks of moisture-containing material, comprising opposed refrigerating members relatively spaced to form an elongated passage therebetween, a plurality of pairs of elements extending into the passage and cooperating in relatively spaced relation to form compartments, means for supplying the uncongealed material to the compartments at one end of the passage, and means for moving the said pairs of elements through the passage where the material within the compartments is congealed into block form.

3. A refrigerating machine for forming congealed blocks of moisture-containing material, comprising elongated refrigerating members forming an elongated open-sided passage therein, traveling means closing the open sided portion of the passage, a plurality of elements extending into the passage and carried in relatively spaced relation on the traveling means to form compartments, and means for supplying the uncongealed material to the compartments at one end of the passage, the traveling means being adapted to move the elements through the passage where the material within the compartments is congealed into block form.

4. A refrigerating machine for forming congealed blocks of moisture-containing material, comprising opposed refrigerating members relatively spaced to form an elongated passage therebetween open at opposite sides, a pair of traveling belts closing the said open sides, a plurality of cooperating pairs of elements extending into the passage and carried in relatively spaced relation on the belts to form compartments and means for supplying the uncongealed material to the compartments at one end of the passage, the belts being adapted to move the elements through the passage where the material within the compartments is congealed into block form.

5. A refrigerating machine for forming congealed blocks of moisture-containing material, comprising opposed refrigerating members relatively spaced to form an elongated passage open at opposite sides, a pair of wheels adjacent the open sides at each end of the passage, a pair of endless belts extending over the wheels and closing the said open sides, a plurality of cooperating pairs of separator plates extending into the passage and carried in relatively spaced relation on the belts to form compartments, and means for supplying the material to be treated to the compartments at one end of the passage, the belts being adapted to move the plates through the passage where the material within the compartments is congealed into block form.

6. A refrigerating machine for forming congealed blocks of moisture-containing material, comprising refrigerating members forming an elongated passage, a plurality of elements extending into the passage and relatively spaced to form compartments, means for supplying the material to be treated to the compartments at one end of the passage, and means for moving the elements through the passage where the material within the compartments is congealed into block form, the elements forming the compartments having vent openings therethrough to permit expansion of the material and the escape of air.

7. A refrigerating machine for forming congealed blocks of moisture-containing material, comprising opposed refrigerating members relatively spaced to form an elongated passage, a plurality of pairs of elements extending into the passage, the elements of each pair being in edge to edge relation at their inner ends but spaced sufficiently to form a vent therebetween and the pairs being relatively spaced to form compartments adapted to receive at one end of the passage the material to be treated, and means for moving the said pairs of elements through the passage where the material within the compartments is congealed into block form.

8. A refrigerating machine for forming congealed blocks of moisture-containing material, comprising two opposed and relatively spaced members having walls forming an elongated passage therebetween, refrigerant-carrying conduits within the members and adjacent to the walls, each of said members having two outside walls, traveling means engaging said outside walls and closing the gap therebetween at opposite sides of the passage, a plurality of elements extending into the passage and carried in relatively spaced relation on the traveling means to form a series of compartments, and means for supplying the material to be treated to the compartments at one end of the passage, the traveling means being adapted to move the elements away from the supply end and through the passage where the material within the compartments is congealed into block form.

9. A refrigerating machine for forming congealed blocks of moisture-containing material, comprising refrigerating means forming two elongated passages, a plurality of elements extending into the passages and relatively spaced to form compartments, means for supplying the material to be treated to the compartments at one end of the passages, and means for moving the elements through the passages where the material within the compartments is congealed into block form, certain of said elements which extend into both said passages being carried by a single carrying means.

10. A refrigerating machine for forming congealed blocks of moisture-containing material, comprising three refrigerating members relatively spaced to form two elongated passages therebetween, a plurality of elements extending into the passages and relatively spaced to form compartments, means for supplying the material to the compartments at one end of the passages, and common means for moving the elements through both passages where the material within the compartments is congealed into block form.

11. A refrigerating machine for forming congealed blocks of moisture-containing material, comprising three relatively spaced members having walls forming two elongated passages therebetween, refrigerant-carrying conduits within the members and adjacent to the walls, each of said members having two outside walls, two traveling belts engaging said outside walls and closing the gaps therebetween at opposite sides of the passages, a plurality of elements extending into the passages and carried in relatively spaced relation on the belts to form compartments, and means for supplying the material to the compartments at one end of the passages, the belts being adapted to move the elements through the passages where the material within the compartments is congealed into block form.

12. A refrigerating machine for forming congealed blocks of moisture-containing material, comprising elongated refrigerating means having an elongated open-sided passage formed therein, a continuous one-piece belt closing the open-sided portion of the passage, a plurality of elements extending into the passage and carried in relatively spaced relation on the belt to form compartments, and means for supplying the material to the compartments at one end of the passage, the belt being adapted to move the elements through the passage where the material within the compartments is congealed into block form.

13. A refrigerating machine for forming congealed blocks of moisture-containing material, comprising elongated refrigerating members having an elongated open-sided passage formed therein, a continuous one-piece belt closing the open-sided portion of the passage, a pair of sprocket wheels supporting the opposite ends of the belt, a plurality of compartment-forming elements extending into the passage and carried in relatively spaced relation on the belt, said elements extending through the belt and providing sprocket teeth at the inner side of the belt, and means for supplying the material to the compartments at one end of the passage, the belt being adapted to move the elements through the passage where the material within the compartments is congealed into block form.

14. A refrigerating machine for forming congealed blocks of moisture-containing material, comprising elongated refrigerating means having a plurality of elongated open-sided passages formed therein, a continuous one-piece belt closing the open sides of the passages, a plurality of compartment-forming elements extending into the passages and carried in relatively spaced relation on the belt, and means for supplying the material to the compartments at one end of the passages, the belt being adapted to move the elements through the passages where the material within the compartments is congealed into block form.

15. A refrigerating machine for forming congealed blocks of moisture-containing material, comprising opposed refrigerating members relatively spaced to form an elongated passage therebetween open at opposite sides, a pair of continuous belts closing the said open sides, a plurality of cooperating pairs of elements extending into the passage and carried in relatively spaced relation on the belts to form compartments, and means for supplying the material to the compartments at one end of the passage, the belts being adapted to move the elements through the passage where the material within the compartments is congealed into block form.

16. A refrigerating machine for forming congealed blocks of moisture-containing material, comprising elongated refrigerating means having formed therein a plurality of passages each open at opposite sides, a pair of traveling belts closing the said open sides, a plurality of cooperating pairs of compartment-forming elements extending into the passages and carried in relatively spaced relation on the belts, and means for supplying the material to the compartments at one end of the passages, the belts being adapted to move the elements through the passages where the material within the compartments is congealed into block form.

17. A refrigerating machine for forming congealed blocks of moisture-containing material, comprising elongated refrigerating means having an open-sided passage formed therein, a traveling belt closing the open-sided portion of the passage, a plurality of compartment-forming elements extending into the passage and carried in relatively spaced relation on the belt, a relatively thick belt on the rear face of the first-mentioned belt and cooperating therewith to seal the said open-sided portion of the passage, and means for supplying the material to the compartments at one end of the passage, the belt being adapted to move the elements through the passage where the material within the compartments is congealed into block form.

18. A refrigerating machine for forming congealed blocks of moisture-containing material, comprising elongated refrigerating members having an open-sided passage formed therein, a traveling belt closing the open side of the passage, a relatively thick belt on the rear face of the first-mentioned belt and cooperating therewith, a link belt rearwardly of the second-mentioned belt, a plurality of compartment-forming elements carried in relatively spaced relation by the link belt and extending through the first and second-named belts and into the passage, and means for supplying the material to the compartments at one end of the passage, the belts being adapted to move the elements through the passage where the material within the compartments is congealed into block form.

19. A refrigerating machine for forming congealed blocks of moisture-containing material, comprising opposed refrigerating members relatively spaced to form an elongated passage therebetween open at opposite sides, a pair of traveling belts closing the said open sides, a pair of relatively thick belts disposed respectively on the rear faces of the first-mentioned belts and cooperating therewith to seal the said open sides, a plurality of cooperating pairs of elements extending into the passage and carried in relatively spaced relation on the belts to form compartments in the passage, and means for supplying the material to the compartments at one end of the passage, the belts being adapted to move the elements through the passage where the material within the compartments is congealed into block form.

20. A refrigerating machine for forming congealed blocks of moisture-containing material, comprising opposed refrigerating members relatively spaced to form an elongated passage therebetween open at opposite sides, a pair of traveling belts closing the said open sides, a pair of relatively thick belts disposed respectively on the rear faces of the first-mentioned belts and cooperating therewith to seal the said open sides, a pair of link belts disposed respectively outside the second-mentioned belts, a plurality of cooperating pairs of compartment-forming elements carried in relatively spaced relation by the link belts and extending through the first and second-named belts and into the passage, and means for supplying the material to the compartments at one end of the passage, the belts being adapted to move the elements through the passage where the material within the compartments is congealed into block form.

21. A refrigerating machine for forming congealed blocks of moisture-containing material, comprising elongated refrigerating members having a plurality of open-sided passages formed therein, means providing drain ports, a continuous belt closing the open sides of the passages and having its edge portions extending into the drain ports, a plurality of compartment forming elements extending into the passages and carried in relatively spaced relation on the belt, and means for supplying the material to the compartments at one end of the passages, the belt being adapted to move the elements through the passages where the material within the compartments is congealed into block form.

22. A refrigerating machine for forming congealed blocks of moisture-containing material, comprising refrigerating members having a plurality of elongated open-sided passages formed therein, means providing drain ports parallel to the said passages and curved outwardly at the upper ends thereof, a movable belt closing the open sides of the passages, the upper end of the belt curving outwardly with its edges extending into the curved portions of the drain ports, a sprocket wheel supporting the belt at its upper curved end, a plurality of compartment-forming elements extending into the passages and carried in relatively spaced relation on the belt, and means including the curved upper end of the belt forming a hopper for supplying the material to be treated to the compartments at the upper ends of the passages, the belt being adapted to move the elements through the passages where the material within the compartments is congealed into block form.

23. A refrigerating machine having heat-conductive walls forming an elongated rectangular passage adapted to receive at one end an unfrozen material in bulk, partitions movable in spaced relation through said passage for feeding the material therethrough and dividing it into defined blocks, and means for refrigerating the blocks thus formed during their transit of the passage, the side walls of the passage being parallel throughout the refrigerating path.

BICKNELL HALL.